United States Patent [19]

Atalla et al.

[11] Patent Number: 4,536,647
[45] Date of Patent: Aug. 20, 1985

[54] POCKET BANKING TERMINAL, METHOD AND SYSTEM

[75] Inventors: Martin M. Atalla, Atherton; Ralph R. Bestock, Los Altos, both of Calif.

[73] Assignee: Atalla Corporation, San Jose, Calif.

[21] Appl. No.: 514,011

[22] Filed: Jul. 15, 1983

[51] Int. Cl.$^3$ ............................................... G06F 15/30
[52] U.S. Cl. .................................. 235/379; 178/22.08; 178/22.10
[58] Field of Search ...................... 235/379; 178/22.08, 178/22.09, 22.10

[56] References Cited

U.S. PATENT DOCUMENTS 4,223,403  9/1980  Konheim et al. ............. 178/22.09 X
4,268,715  5/1981  Atalla ............................ 235/379 X
4,283,599  8/1981  Atalla ............................ 235/379 X
4,423,287 12/1983  Zeidler ......................... 235/379 X

*Primary Examiner*—David L. Trafton
*Attorney, Agent, or Firm*—A. C. Smith

[57] ABSTRACT

A portable banking terminal under control of an authorized user and operating within a system of banks and retailers may be initialized for personal use under separate controls by the banks and the retailers to facilitate the completion of basic transactions such as deposits and withdrawals from remote locations. Multiple verification checks for authorization of the user secure the transactions against interception and alteration during transmission over unsecured communication channels.

15 Claims, 9 Drawing Figures

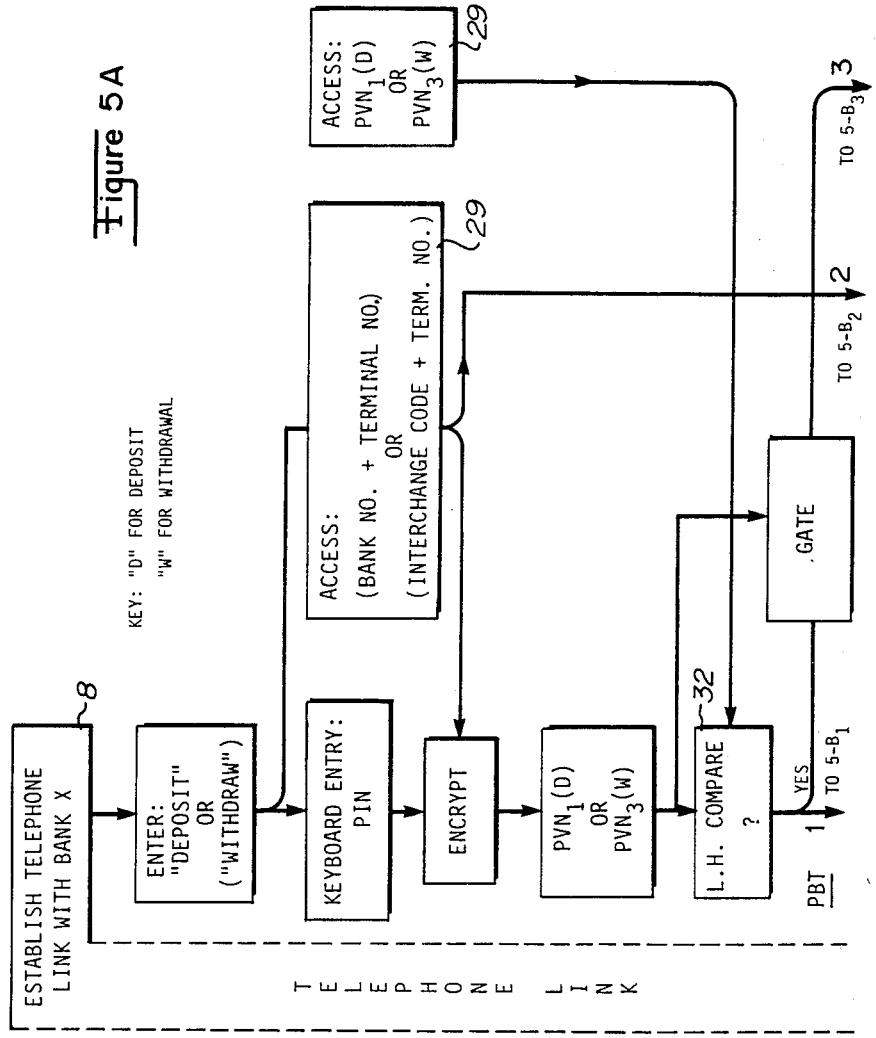

POCKET BANKING TERMINAL, METHOD AND SYSTEM

BACKGROUND OF THE INVENTION

Automatic teller equipment has become well accepted as the versatile means through which customers can conduct basic banking business at any time and at diverse locations away from the bank. The number of such automatic teller units is likely to increase dramatically in the future, at substantial expense to the banks and institutions that operate them, without fully satisfying customers' demands for banking services available at any time and at any location where the customer may be.

Additionally, point-of-sale terminals are rapidly increasing in number and popularity among retailers who rely on them as versatile means for completing sale transactions with non-cash paying customers. Such customers prefer to pay with credit cards or checks which, in turn, are also tied to banks at diverse locations. The non-cash-paying customer, therefore, must rely on checks or credit cards as token indications of his established business relationship with his banking institution, and neither the retailer nor the customer can directly or immediately involve their respective banking institutions to transfer value from the customer to the retailer during the process of completing the transaction. Data communications schemes over unsecured channels are known from the literature (see, for example, U.S. Pat. Nos. 4,283,599; 4,281,215; 4,268,715; and 4,315,101), but these schemes may not be adequate for actually transferring funds on deposit from one account to another.

SUMMARY OF THE INVENTION

In accordance with the present invention, the portable pocket-style banking terminal, method and system permit secured banking transactions such as deposits, withdrawals, and account-balance review by an individual at any location where a telephone or a point-of-sale terminal is available. Each Pocket Banking Terminal (PBT, herein) includes conventional display and keyboard elements as well as a microprocessor and Data Encryption Standard (DES) as the encoding/decoding circuitry, and segregated memory registers containing codes and data that are uniquely under control of banks, retailers and the individual user. In this way, deposits to the PBT are handled under codes and conditions which are distinct from the codes and conditions under which withdrawals from the PBT are handled. Uniquely-encoded data-transfer encrypting schemes are set up between the PBT and bank using unsecured telephone lines with a high degree of immunity from unauthorized interception or manipulation of the transferred data.

BEST MODE FOR CARRYING OUT THE INVENTION

Figure 1:
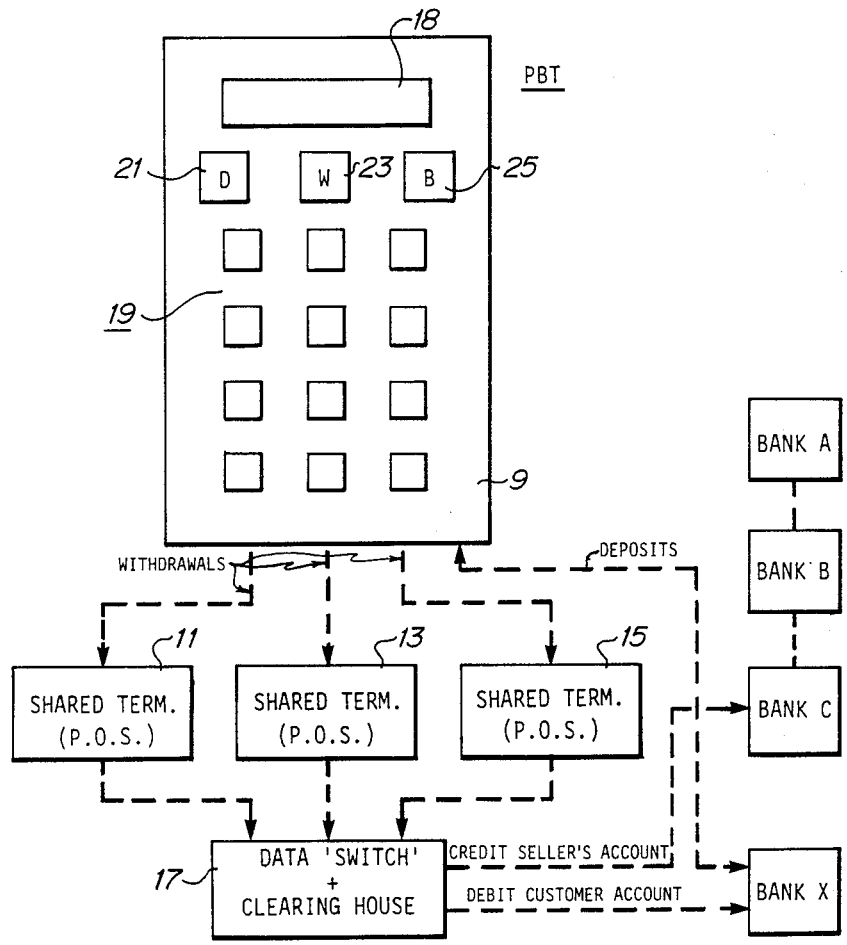
FIG. 1 is a chart showing the pocket banking terminal and system of the present invention.
Figure 2:
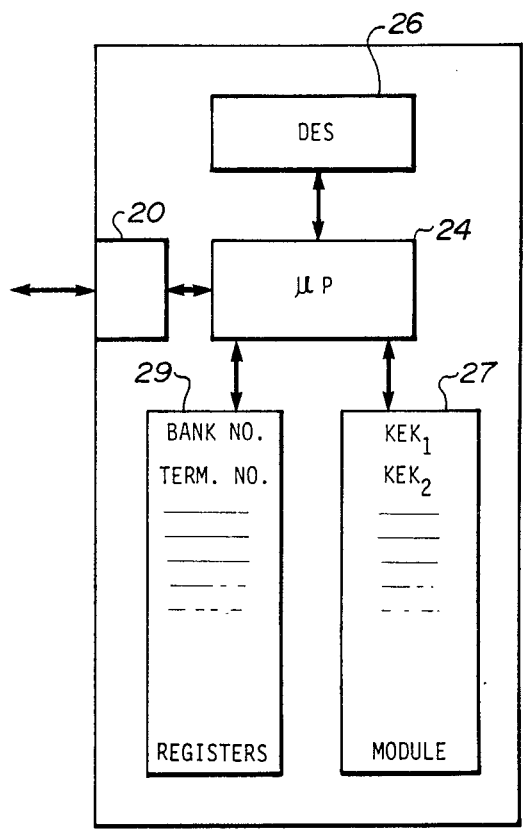
FIG. 2 is an illustration of structural elements of the pocket banking terminal of the present invention.

Referring now to FIG. 1, there is shown an embodiment of the present pocket banking terminal, method and system in which the customer of bank X possesses a pocket banking terminal 9 that is uniquely encoded for operation as a remote terminal. Such customer may interact with numerous retailers, each of whom may have shared terminals, or point-of-sale terminals 11, 13, 15, etc., which communicate with respective banks A, B, C, etc., via conventional data interchange, or "switch", and clearinghouse operations 17. Thus, the customer of bank X can make deposits to his PBT account via the pocket terminal 9, and can make withdrawals, as in sale transactions or cash withdrawals from automatic teller machines, via the pocket terminal 9. Each such PBT has a display 18 and a key pad 19 of push-buttons designated by alphanumerics similar to those used on touch-tone telephone equipment. In addition, each PBT includes a row of push-buttons, or keys, designated "DEPOSIT" 21, "WITHDRAWAL" 23, and "BALANCE" 25, and, as shown in FIG. 2, each PBT also contains a microprocessor 24, memory modules, and a Data Encryption Standard circuit module 26 (all circuits commercially available from Motorola Corp. and others) that operate to encrypt and decrypt applied data signals according to National Bureau of Standards encryption/decryption conventions. As shown in FIG. 2, the memory modules are separated into fixed-encoded memory modules 27 and working memory registers 29 in such manner that the contents of modules 27 are used to secure the data transfers to and from the registers 29.

In operation, the PBT is considered to be a portable extension of the account maintained at the user's bank X. Deposits are made to the PBT from bank X and withdrawals are made from the PBT to shared terminals, such as point-of-sales terminals or automatic teller machines, or the like, via encrypted data links established between the PBT and bank X. Additionally, the balance on deposit in the PBT can be determined and displayed. Several encrypting key codes must be initially established in modules 27 in order to render each PBT unique to an assigned customer. Thus, to make deposits to the PBT, it must be "conditioned" with requisite key codes including the identification code of bank X and the unique code number of the PBT. This information may be included in the registers 29 in conventional manner using programmable read-only memories (PROM's), or the like, as a data word of several bits, the most-significant bits of which represent the bank identification code and the remaining significant bits of which represent the terminal number. This may be accomplished initially for each PBT without involving any customer. The scheme involved in initializing a PBT for a particular user will now be described.

Figure 3:
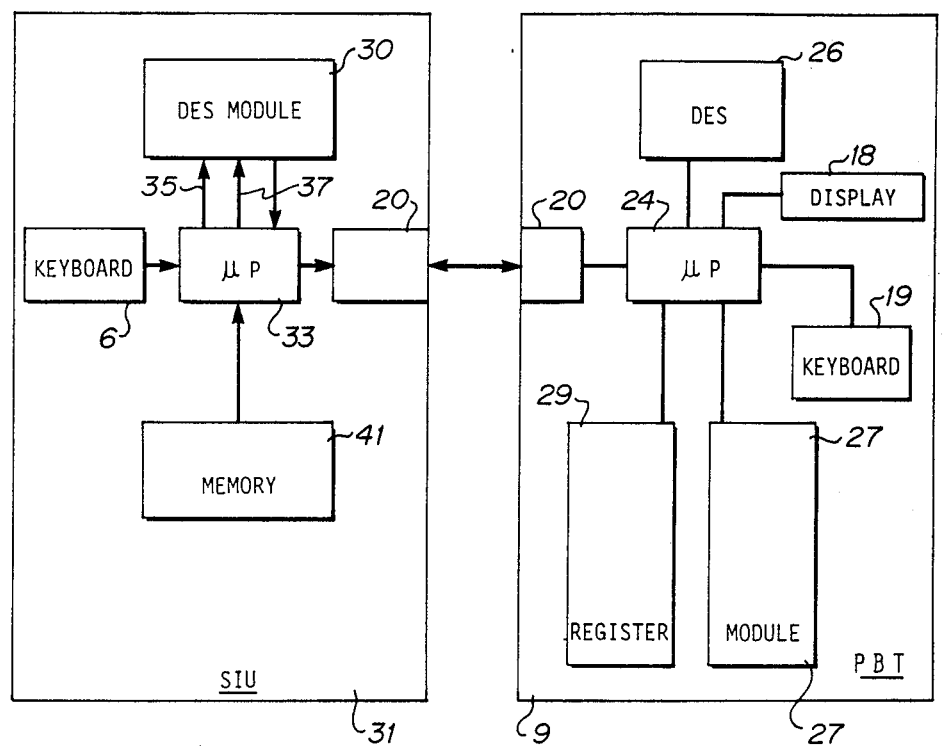
FIG. 3 is an illustration of one embodiment of a security-initialization unit and pocket banking terminal operatively coupled for initializing the terminal to operate with a particular user.

Referring to FIG. 3, there is shown a block schematic diagram of one embodiment of a Security-Initialization Unit (SIU) 31 by which a PBT is initially conditioned for a particular user who is a customer of bank X. In this embodiment, the microprocessor 33 of the SIU 31 may be coupled interactively with the microprocessor 24 of the PBT using conventional network techniques to operate the microprocessor 24 in a "slave" mode to the microprocessor 33. However, it should be understood that since the SIU and PBT have similar operating elements, another embodiment of the SIU simply controls the microprocessor 24 of the PBT and supplies the encryption keys thereto during initialization, as now described.

Figure 4:
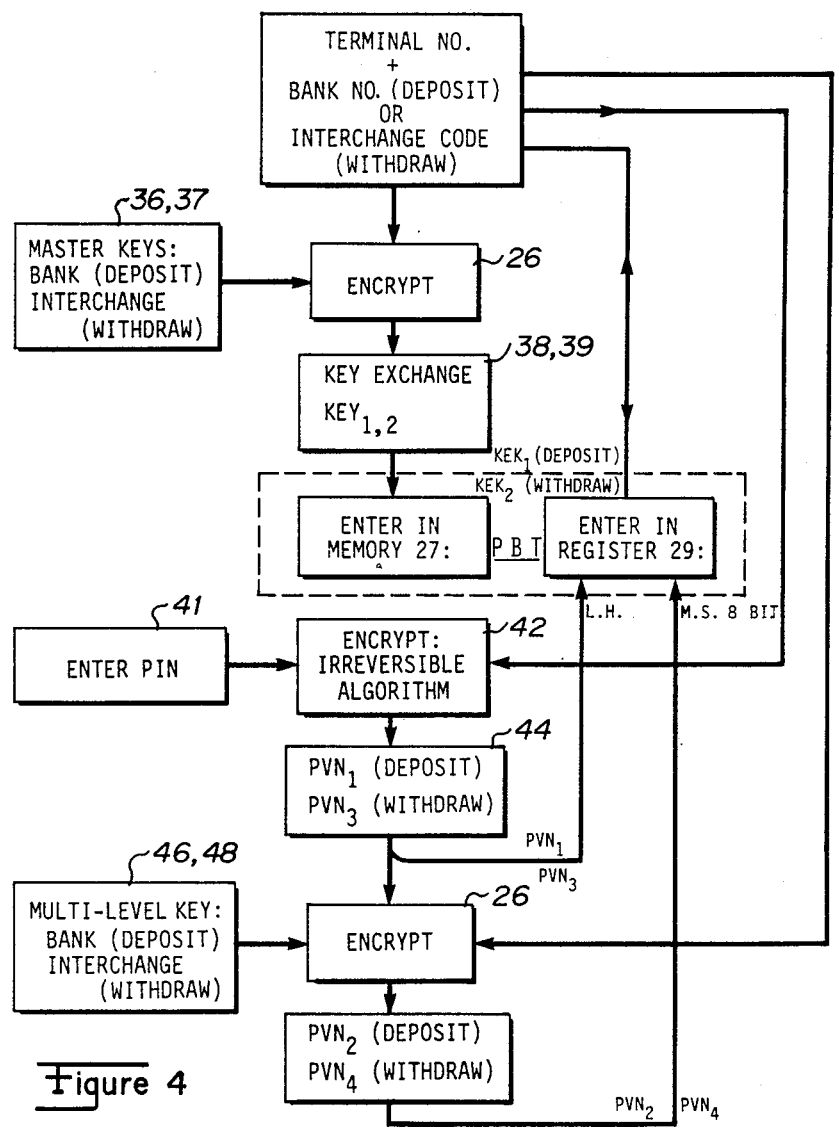
FIG. 4 is a signal-flow chart illustrating the initialization procedure associated with a pocket banking terminal assigned to a particular user.

Referring to the signal-flow chart of FIG. 4, the PBT to be conditioned is connected to the SIU for interaction with the microprocessor 24 of the PBT for accessing the register 29 and memory modules 27 in the PBT. Under control of the microprocessor 24, the Data Encryption Standard module 26 receives the data accessed from register 29 of the PBT, including the composite bank I.D. number and the terminal number. Bank X supplies its own unique master key code 37 (for deposits) and generates therefrom a Key-Exchange Key$_1$ (KEK$_1$) code 39 which is entered in the secured modules 27 of the PBT. The particular customer now selects his own personal identification number (PIN) 41 which need only be known to him and which may be of arbitrary length. This PIN may be entered through the keyboard 19 and is applied with the bank I.D. number and his own account number (or the terminal number) to the encryption module 26 which executes an irreversible encrypting algorithm 42 on such data to yield an 8-digit Personal Verification Number$_1$ 44. Algorithmic encryption schemes 41 of this type are disclosed in the literature (see, for example, U.S. Pat. No. 3,938,091). One portion, say, the left half (most-significant bits) of PVN$_1$, is also entered into the registers 29 of the PBT.

The conditioning of the PBT for accepting deposits (withdrawals are conditioned differently, as later described) now requires that a new set of data be applied to the DES module 26 including PVN$_1$ and the composite bank I.D. and PBT terminal number. In addition, the bank X applies its multilevel key code (for deposits) 46, and the DES module, under control of the processor 24, generates a Personal Verification Number$_2$. This PVN$_2$ is stored by the bank and one portion, say, the eight most-significant bits thereof, are also entered into the registers 29 of the PBT. The entries thus made in registers 29 and in module 27 of the PBT are suitable for making deposits (and the special case of making withdrawals only via bank X). Of course, this initialization process may also be performed using an external microprocessor 33 and associated modules 6, 41, etc., as shown in FIG. 3, with the microprocessor 24 of the PBT merely operating in "slave" mode to read and write in modules 27 and registers 29.

To condition the PBT for withdrawals generally from any point-of-sale terminal or other shared terminal, it is necessary to generate a new Key-Exchange Key$_2$. This is accomplished as previously described in connection with deposits, except that a new interchange Master Key (for withdrawals) 36 is applied to the DES, and the KEK$_2$ 38 thus produced is also entered into the module 27. Additionally, a new PVN$_3$, generated as previously described for PVN$_1$ but using the terminal number and the interchange code (instead of the bank number), and a composite interchange code and terminal number are applied to the DES module along with a new multilevel key (for withdrawals) 48 to generate Personal Verification Number$_4$. Again, one portion of this number, say, the eight most-significant bits thereof, are entered into registers 29. Thus, upon completion of the conditioning of a PBT, the registers 29 will have entered therein the composite bank I.D. and terminal number, the composite interchange code and terminal number, the left-half portion of PVN$_1$, eight digits of PVN$_2$, the left-half portion of PVN$_3$, and the eight digits of PVN$_4$, and the memory module 27 will have entered therein the KEK$_1$ and the KEK$_2$. The customer, with his secret and unique PIN, is now ready to operate the PBT which has been conditioned for him alone. Of course, the above-described initialization may also be performed using another DES module 30 and associated microprocessor controller 33, as shown in FIG. 3, with the resulting Key-Exchange Keys and Personal Verification Numbers being entered into the registers 29 and memory modules 27 of a PBT via the microprocessor 24.

The signal-flow chart of FIGS. 5A–5D illustrates how an authorized user communicates with bank X to make deposits to the PBT from his account at bank X. The user attaches his PBT to a telephone network via a standard, modularized four-wire telephone connector 20 which, in turn, couples to the microprocessor 24, memory modules 27 and registers 29. A telephone communication link 8 is established with bank X, for example, via conventional autodialing routine within registers 29 under control of microprocessor 24, and the user presses "DEPOSIT" button 21. He then enters his PIN and this number, together with the composite bank number and terminal number from registers 29, is applied to the DES module 26 which performs the same irreversible encryption algorithm thereon as was used during the initial conditioning scheme (previously described in connection with FIGS. 3 and 4) to produce a PVN$_1$. If the left half of this PVN$_1$ compares 32 favorably with the left half of the PVN$_1$ stored in registers 29, then this initial verification of the authorized user activates bank X to generate a random number, say, 64 bits long that is received by the PBT. Another random number is generated by the PBT, and these two random numbers are applied to the DES module 26 under the control of the microprocessor 26 in the PBT, along with the KEK$_1$ (for deposits) that is accessed internally from memory modules 27 to yield an encrypted number in the PBT which shall serve as the Session Key (SK) 34 for this communication only. This SK thus generated in the PBT is now applied to the DES module 26 as the encryption key along with data including PVN$_1$, PVN$_2$, the existing balance (all from registers 29) and the proposed new deposit 50 entered via keyboard 19 by the user. This yields an encrypted message 52 which is transmitted to bank X via the telephone link 8 along with the composite bank number and terminal number (accessed from registers 29) and the random number generated by the PBT for this session. Note that the encrypted message, and the composite bank number and terminal number and the random number thus transmitted contain no useful information, if unauthorizedly intercepted, that could be used to compromise the bank's or user's security, so these messages and numbers may be transmitted in clear text without further encryption.

When bank X receives the encrypted message, the composite bank number and terminal number and the random number generated by the PBT, bank X is able to re-generate the Session Key (SK) generated by the PBT and used thereby to encrypt the message and numbers transmitted to bank X. Thus, the composite bank number and terminal number and the bank's Master Key are applied to a DES module at the bank X where they are encrypted (as was done during the initial conditioning scheme) to yield an encrypted word that should match the Key-Exchange Key which is entered in the memory modules 27 of the PBT. Bank X now applies to the DES module its own random number (previously transmitted to PBT for this session), and the random number received from the PBT, and the KEK just generated to yield a Session Key (SK) which should match the SK generated by the PBT for this session. The SK thus generated by the bank can now be applied to the DES module to decrypt 54 the encrypted message transitted by the PBT. The decrypted message includes the newly-created $PVN_1$ and $PVN_2$ that are the same as originally generated and entered in the registers 29 during the initial conditioning scheme. $PVN_1$ and the composite bank number and terminal number are then applied to the DES module along with the bank's multilevel key (for deposits) to yield the $PVN_2$ 56 (as was done during the initial conditioning scheme). If this $PVN_2$ compares favorably with the $PVN_2$ stored for that user and PBT, then the bank X checks the deposit account for the identified user to determine whether his balance on deposit is large enough to allow transfer therefrom of the proposed new deposit (also decrypted by the Session Key) to the PBT. If this comparison of balance and proposed deposit is favorable, bank X then applies to the DES module the old balance in the PBT, the resulting new balance in the PBT (upon addition of the proposed deposit), the random number generated by the bank for this session (and/or other return message such as balance left on deposit at bank X), along with the Session Key to yield an encrypted message.

This encrypted message is transmitted via the telephone link 8 to the PBT which can decrypt the message with its own, matching Session Key 34 to yield the old balance and the new balance. The old balance thus decrypted is compared with the old balance present in registers 29, and if favorable (indicating no data alterations in transmissions to and from bank X), the new balance may be entered in register 29 to the exclusion of the old balance entry therein. The return message, if any, is also decrypted and may be coded to activate the display 18 of the PBT.

Figure 5:
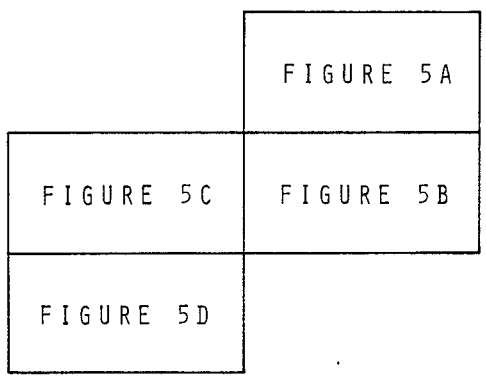
FIGS. 5A, B, C and D illustrate the interaction between a pocket banking terminal and a bank in making deposit (or data interchange in making withdrawal).
Figure 5B:
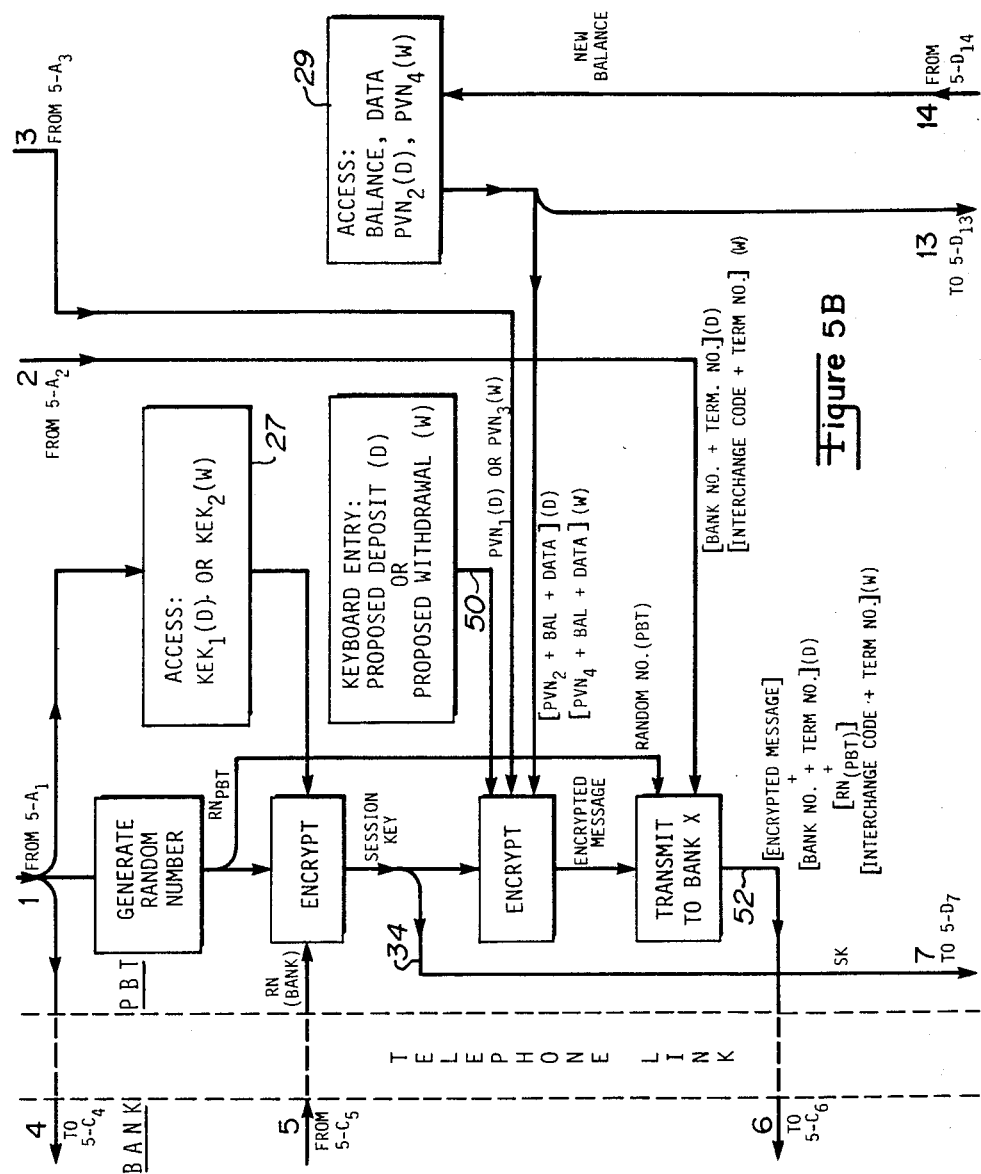
Figure 5C:
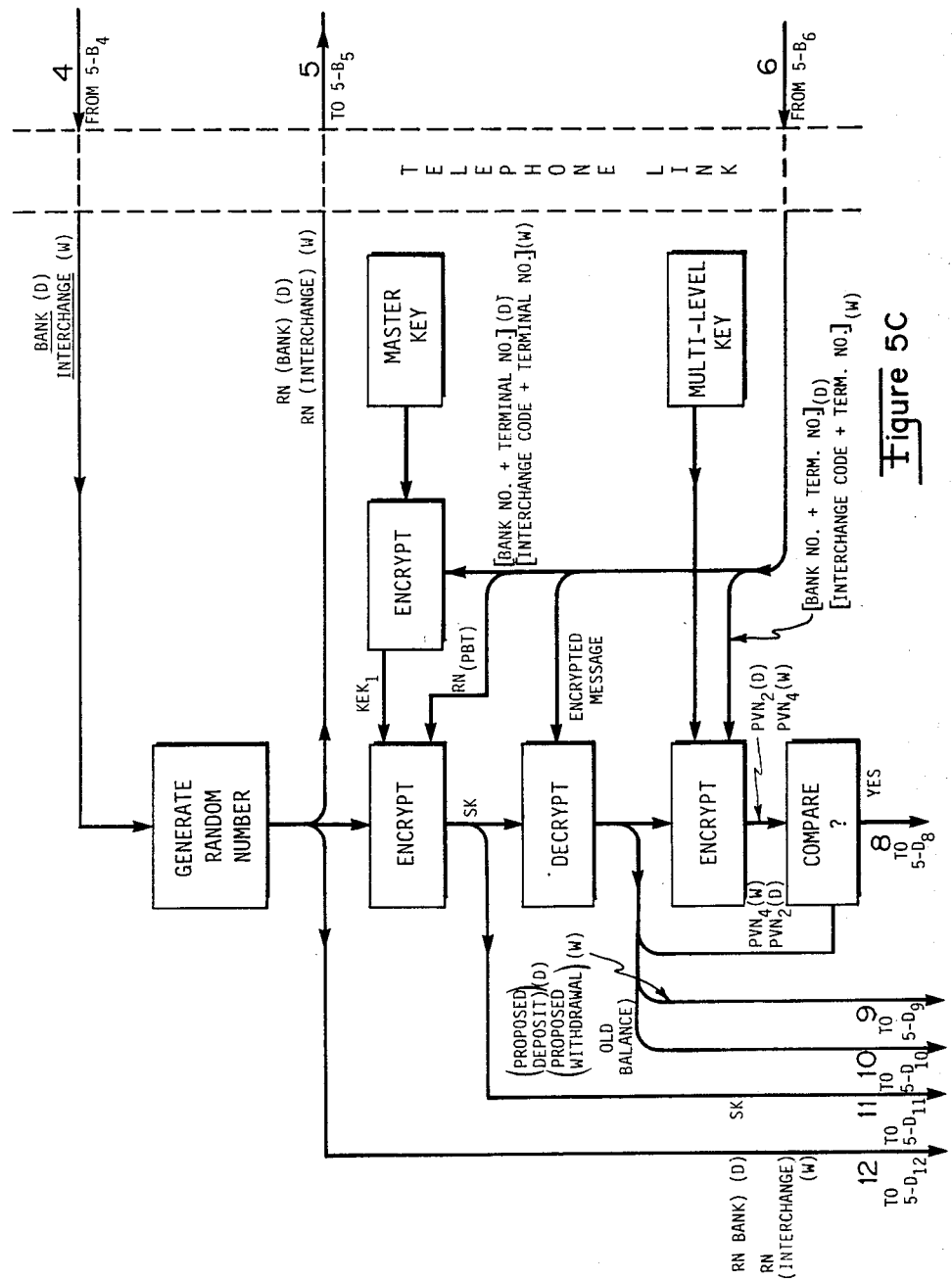
Figure 5D:
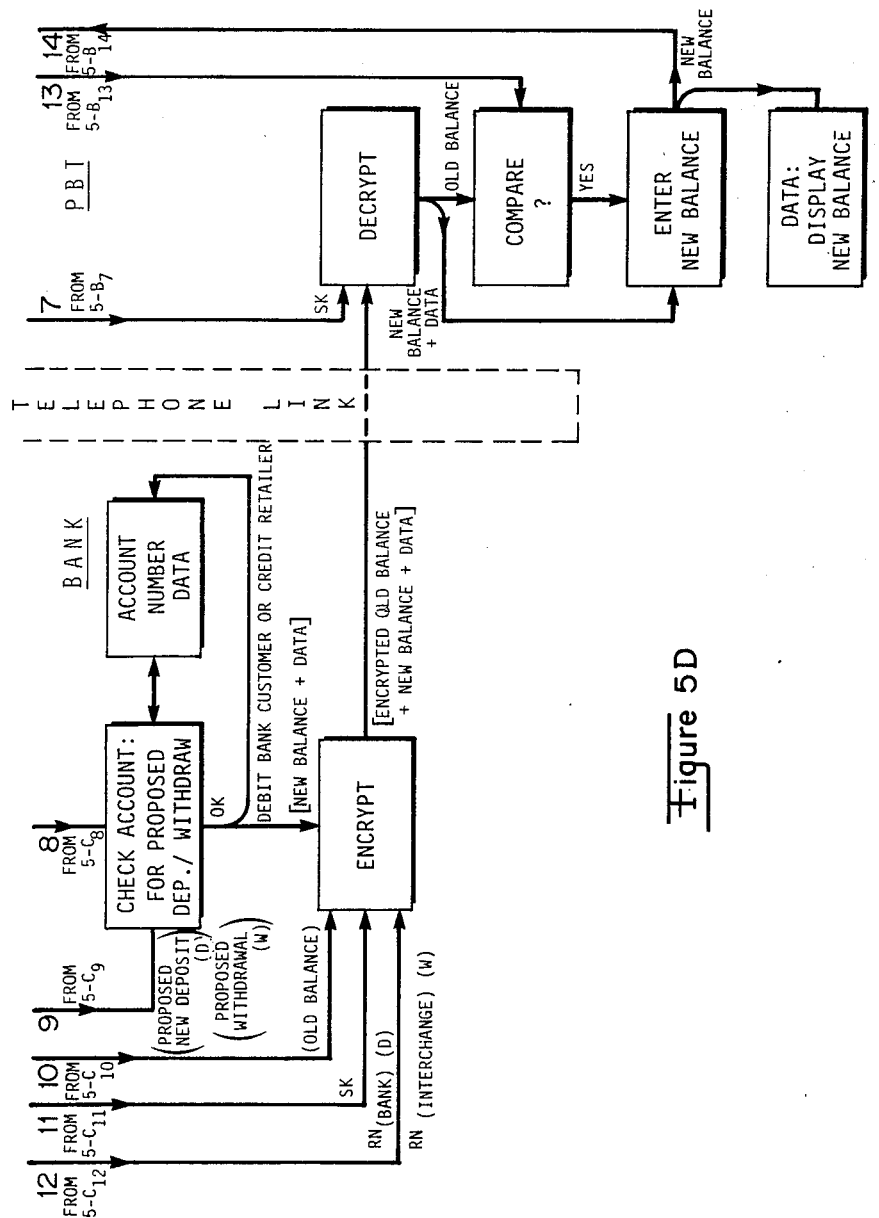

It should be noted from the above description in connection with the flow chart of FIG. 5 that "BALANCE" information can be displayed in similar manner. An authorized user may perform the same steps described above for "DEPOSIT", except that no proposed new deposit number need be entered when the "BALANCE" button 25 is depressed. An alternative embodiment of the present invention permits display of the balance on deposit in the PBT simply by entering the user's PIN and depressing the "BALANCE" button. This may be accomplished by encrypting the PIN, as previously described, and by comparing the corresponding portions of the encrypted $PVN_1$ and the stored $PVN_1$ for accessing the balance information in register 29 upon favorable comparison.

In accordance with the preferred embodiment of the present invention, the encryption keys established for deposit and balance operations are separate from the encryption keys established for withdrawal operations. This has the advantage that the institutions (when separate from bank X and its own automatic tellers) which serve as a clearinghouse or data interchange or switch 17 for the point-of-sale terminals 11, 13, 15 of retailers may also control the security of the PBT. This is accomplished by introducing into the initialization scheme, as described in connection with FIG. 4, a set of key codes that the banking institutions do not have knowledge about. Thus, the bank Master Key (for deposits) 37 is replaced with an interchange Master Key (for withdrawals) 36, and this is applied to the DES module along with a composite number including the interchange code and terminal number to produce an encrypted Key-Exchange Key$_2$ (for withdrawals) in manner similar to that described in connection with $KEK_1$ (for deposits). The $KEK_2$ (for withdrawals) is entered in module 27 of the PBT.

The user of the PBT being initialized supplies his secret Personal Identification Number (PIN) 41, along with the terminal number and interchange code number (instead of bank number) to be encrypted in accordance with an irreversible algorithm 42 to yield a new 8-digit Personal Verification Number$_3$, the left-half portion (most-significant bits) of which may be entered in registers 29. Irreversible encryption algorithms are disclosed, for example, in the aforementioned U.S. Pat. No. 3,983,091. Also, the bank multilevel key (for deposits) is replaced with an interchange multilevel key (for withdrawals), and this is applied to the DES module along with the $PVN_3$ and a composite number including the interchange code and terminal number to produce the encrypted Personal Verification Number$_4$ ($PVN_4$), the eight most-significant bits of which may be entered in registers 29 for use in establishing Session Keys during a withdrawal transaction.

When initialization of a PBT for a particular user is completed, the memory modules 27 contain entries of $KEK_1$ (for deposits) and $KEK_2$ (for withdrawals) which are secured therein using conventional means (e.g., Motorola 68705P5) against external access or alteration. In addition, the registers 29 contain entries of the composite bank number and terminal number, the composite interchange number and terminal number, the left-half portion of $PVN_1$ (for deposits), the 8-digit $PVN_2$ (for deposits), the left-half portion of $PVN_3$ (for withdrawals), the 8-digit $PVN_4$ (for withdrawals), and an initial balance on deposit in the PBT. It should be noted that the left portions of $PVN_1$ and $PVN_3$ are stored in the PBT to facilitate first-level verification of the user's identity. The full $PVN_1$ or $PVN_3$ is used in the "DEPOSIT" or "WITHDRAW" transaction. The PBT thus initialized is capable of operating with a point-of-sale terminal or other shared terminal to complete a withdrawal transaction in manner similar to the operation of a deposit transaction, as previously described. Specifically, the authorized user attaches the PBT to a point-of-sale unit via standard, modular, four-wire telephone connector 20 for accessing the encrypted messages. The user or point-of-sale retailer establishes telephone contact with the data interchange 17 (instead of bank X in the description of "DEPOSIT") and presses the "WITHDRAW" button 23. In addition, he enters his secret PIN. The DES module 26 under control of the microprocessor 24 encrypts the PIN with the composite interchange number and terminal number using the same irreversible algorithm as was used during the initialization scheme to generate $PVN_3$. This encrypted number is then compared with the $PVN_3$ (for withdrawals) contained in register 29 and, upon favorable comparison of the left-half portions as an initial authorization check, the data interchange 17 is actuated to generate and transmit back to the PBT a random number. The PBT also generates a random number which is applied to the DES module 26 with the random number received from the data interchange and the $KEK_2$ (for withdrawals) accessed from module 27. The encrypted output serves as the Session Key for this withdrawal transaction. The newly created $PVN_3$, $PVN_4$, and balance on deposit in the PBT from registers 29 are applied to DES module 26 along with the proposed amount for withdrawal (entered via keyboard 19). The Session Key generated for this withdrawal transaction controls encryption of the applied number codes to yield an encrypted message at the output of DES module 26. This encrypted message, and the composite data interchange code and terminal number, and random number generated by the PBT are all transmitted to the data interchange 17 via the telephone link 8. Note that these signals do not contain information which could be useful if intercepted during transmission over unsecured communication channels, so they may be transmitted in clear text without further encryption.

When these signals are received at the data interchange 17, the composite interchange code and terminal number are encrypted in a DES module using the interchange Master Key and the same encryption scheme as previously used during the initialization scheme to yield $KEK_2$ (for withdrawals). This $KEK_2$ is then used to control encryption in the DES module of the random number (received from PBT) and random number (generated at the data interchange) to yield a Session Key which should match the Session Key independently generated at the PBT. This Session Key can now be used in the DES module to decrypt the received encrypted message, the $PVN_3$, the $PVN_4$, the balance on deposit at the PBT and the proposed amount of the withdrawal. The $PVN_3$ thus decrypted, along with the composite data interchange code and terminal number, is now encrypted in the DES module using the interchange multilevel key to yield $PVN_4$ according to the same encryption algorithm as was previously used during the initialization scheme. This encrypted $PVN_4$ is compared with the decrypted $PVN_4$ received from the PBT and, if favorable, the balance on deposit at the PBT is checked to determine whether it is larger than the proposed amount of withdrawal. If so, the withdrawn amount may be credited to the account of the retailer whose point-of-sale terminal is identified during the transaction. Additionally, the old balance in the PBT, the new balance (after the withdrawal) and the random number generated by the data interchange are encrypted in the DES module using the Session Key to yield an encrypted message which is returned to the PBT.

The return encrypted message received at the PBT is decrypted in DES module 26 using the Session Key generated for this transaction to yield the decrypted old balance and new balance. The old balances are compared and, if matched (as an indication of unaltered transmissions out and back), the new balance is entered into registers 29 to the exclusion of the old balance, and the new balance may be displayed by display 18.

Therefore, the pocket banking terminal, method and system according to the present invention permit basic banking transactions to take place at remote locations with a high degree of security against unauthorized use or alteration of data during data communications over unsecured communication channels. In addition, the use of separate encryption keys for deposits under control of the bank or other deposit-account institution, and encryption keys for withdrawals under control of a retailer's representative assures a high degree of security against unauthorized or counterfeit transactions between the banks, the retailers and their customers.

What is claimed is:

1. The method of securing communications concerning selected data between an entity which has a master key code and a portable terminal which stores a plural number of codes that are unique to the entity and the terminal for operation by an authorized user having a Personal Identification Number, the method comprising:

encrypting in accordance with a first logical combination of the user's Personal Identification Number and the entity and terminal codes to produce a Personal Verification Number;

comparing the Personal Verification Number produced by encryption with a Personal Verification Number previously established for an authorized user and stored in the terminal to activate, upon favorable comparison thereof, the generation of random numbers at the entity and at the terminal;

transmitting the random number generated at the entity to the terminal and the random number generated at the terminal to the entity;

encrypting at the entity and at the terminal in accordance with a second logical combination the random numbers generated at the entity and at the terminal with a Key-Exchange Key at the entity and at the terminal to produce a Session Key at the entity and at the terminal;

encrypting at the terminal as a third logical combination the selected data and the Session Key to produce an encrypted message for transmission to the entity;

decrypting the encrypted message at the entity in accordance with the third logical combination to yield the selected data;

altering portions of the decrypted selected data at the entity and encrypting the same according to the third logical combination with the Session Key to produce a return encrypted message for transmission to the terminal; and decrypting the return encrypted message at the terminal in accordance with the third logical combination to yield the altered data for operation thereon at the terminal.

2. The method according to claim 1 wherein the step of encrypting at the terminal as the third logical combination includes combining with the selected data a secondary Personal Verification Number which is stored in the terminal as an encryption according to a fourth logical combination of the entity code, the terminal code and an entity encryption key; and wherein the step of decrypting the encrypted message at the entity includes decrypting the secondary Personal Verification Number; and comprising the additional step of encrypting at the entity according to the fourth logical combination the entity code, the terminal code and the entity encryption key to produce a secondary Personal Verification Number for comparison with the decrypted secondary Personal Verification Number as an indication of unaltered transmission and reception of the encrypted message at the entity.

3. The method according to claim 1 comprising the preliminary steps of encrypting in accordance with the first logical combination of the user's Personal Identification Number and the entity code and the terminal code to produce said Personal Verification Number; and storing said Personal Verification Number in said terminal.

4. The method according to claim 1 comprising the additional steps, performed in selected sequence, of encrypting in accordance with a fifth logical sequence the terminal code, the entity code and an entity master key to produce the Key-Exchange Key for storage in the terminal prior to secured communication therewith and for use at the entity in encrypting said random numbers in accordance with said second logical combination.

5. The method according to claim 1 wherein in the step of encrypting at the terminal as a third logical combination, said selected data includes information about the balance on deposit at the terminal;

the step of decrypting the encrypted message at the entity includes decrypting the information about the balance on deposit at the terminal;

the step of producing a return encrypted message at the entity includes encrypting the information about the balance on deposit;

the step of decrypting the return encrypted message at the terminal includes decrypting the information about balance on deposit; and comprising the additional step of comparing the information about balance on deposit decrypted at the terminal from the return encrypted message with the information about balance on deposit at the terminal as an indication of the unaltered transmission and reception of the encrypted message and the return encrypted message.

6. The method according to claim 1 wherein the master key code to increment the balance on deposit at the terminal is different from the master key code to decrement the balance on deposit at the terminal.

7. A system including a portable terminal for operation by an authorized individual having a Personal Identification Number to provide secured data communications with a remote entity via a communication network, the system comprising:

manually-actuatable switch means for controlling operation of the terminal;

circuit means in the terminal responsive to operation of selected switch means in accordance with the user's Personal Identification Number for producing a first signal as an indication of the authority of the user to operate the terminal;

means at the entity responsive to the first signal for generating and communicating to the terminal a first random number;

means at the terminal responsive to the first signal for generating a second random number;

first encryption means in the terminal for encrypting according to a first logical combination the first and second random numbers with a first key code to produce a Session Key for controlling communication of encrypted data between remote entity and terminal;

second encryption means for encrypting according to a second logical combination of selected data and the Session Key to produce an encrypted message for communicating with the second random number to the remote entity;

third encryption means at the remote entity for encrypting according to said first logical combination of the first random number and the received second random number with the first key code to produce said Session Key at the entity for controlling communication of encrypted data between remot entity and terminal;

first decryption means at the entity responsive to the Session Key generated thereat for decrypting the received encrypted message according to said second logical combination to yield the selected data;

second circuit means at the entity selectively operable for altering selected data;

fourth encryption means for encrypting according to a third logical combination of the altered data and Session Key to yield an encrypted altered message for communicating to the terminal; and second decryption means at said terminal for decrypting in accordance with said third logical combination the received encrypted altered message and Session Key to yield the altered data.

8. The system according to claim 7 wherein said circuit means includes:

storage means having an entity number and a terminal number stored therein;

fifth encryption means for encrypting as a fourth logical combination of the entity number, the terminal number supplied thereto from the storage means and the Personal Identification Number of the user supplied thereto by the user via the switch means to yield a first Personal Verification Number;

means storing in said storage means a selected portion of a first Personal Verification Number previously produced according to said fourth logical combination of said entity number, terminal number and Personal Identification Number supplied by the authorized user; and comparator means for producing said first signal in response to favorable comparison of said stored selected portion of first Personal Verification Number and the corresponding selected portion of the first Personal Verification Number produced by said fifth encryption means.

9. The system according to claim 7 comprising sixth encryption means for encrypting according to a fifth logical combination of the entity number, the terminal number and an entity master key to yield said first key code; and said storage means in the terminal includes therein the first key code previously produced in accordance with said fifth logical combination for access therefrom in response to the appearance of said first signal.

10. The system according to claim 8 comprising seventh encryption means at said entity for encrypting according to a sixth logical combination the entity number, the terminal number and auxiliary entity key for producing a second Personal Verification Number;

said storage means in said terminal including therein a second Personal Verification Number which is accessible therefrom for encrypting in accordance with said second logical combination said selected data and the first Personal Verification Number; and comparator means in said entity for producing a second signal in response to favorable comparison of the decrypted second Personal Verification Number from the first decryption means with the second Personal Verification Number produced by said seventh encryption means; and said second circuit means being responsive to said second signal for altering selected data.

11. The system according to claim 7 wherein the fourth encryption means encrypts according to the third logical combination of the altered data and the selected data and Session Key to yield the encrypted altered message; and comprising
comparator means at the terminal responsive to the decrypted selected data at the output of the second decryption means and to the selected data supplied to the second encryption means for producing an indication upon favorable comparison thereof of unaltered transmissions and receptions between entity and terminal of encrypted message and encrypted altered message.

12. Apparatus for operation in the system of claim 7 as a portable terminal capable of secured communications via a communication network with selected entities under the control of an authorized individual having a Personal Identification Number, the apparatus comprising:
storage means for storing code information at a plurality of separate addressed locations, and including therein:
a selected number of entity codes at separate addressed locations;
a terminal code at another addressed location;
a plural number of Personal Verification Numbers at other separate addressed locations; and
a selected number of Key-Exchange Keys at still other separate addressed locations, wherein the selected number of entity codes, the plural number of Personal Verification Numbers and the selected number of Key-Exchange Keys are representative of the number of different entities to communicate with;
a plurality of manually-operatable switch means for controlling operation of the terminal;
display means for providing visual indication of data;
network coupling means for transmitting encrypted messages and receiving encrypted altered messages between the communication network and terminal;
digital data processing means coupled to the switch means and display means; and
said first and second encryption means and said second decryption means under control of the processing means for encrypting and decrypting said keys, codes and data in response to operation of selected switch means.

13. Initializing apparatus for the system of claim 8 to initialize each terminal for operation with an authorized individual who has a Personal Identification Number, the initializing apparatus comprising:
a data encryption module for encoding data applied thereto;
keyboard data entry means;
memory means including selected codes and keys of the entity;
auxiliary digital data processing means coupled to said data encryption module and to said keyboard data entry means and to said memory means for encrypting data signals from the keyboard data entry means and memory means in accordance with said fourth logical combination to supply said first Personal Verification Number to the terminal for storage therein.

14. Initializing apparatus for the system of claim 9 to initialize each terminal for operation with an authorized individual who has a Personal Identification Number, the initializing apparatus comprising:
a data encryption module for encoding data applied thereto;
keyboard data entry means;
memory means including selected codes and keys of the entity;
auxiliary digital data processing means coupled to said data encryption module and to said keyboard data entry means and to said memory means for encrypting data signals from the keyboard data entry means and memory means in accordance with said fifth logical combination of the entity number, the terminal number and the entity master key to supply said first key code to the terminal for storage therein.

15. Initializing apparatus for the system of claim 10 to initialize each terminal for operation with an authorized individual who has a Personal Identification Number, the initializing apparatus comprising:
a data encryption module for encoding data applied thereto;
keyboard data entry means;
memory means including selected codes and keys of the entity;
auxiliary digital data processing means coupled to said data encryption module and to said keyboard data entry means and to said memory means for encrypting data signals from the keyboard data entry means and memory means in accordance with said sixth logical combination of the entity number, the terminal number, the first Personal Verification Number, and the auxiliary entity key to supply said second Personal Verification Number to the terminal for storage therein.

* * * * *